Dec. 29, 1936.   S. B. CRARY   2,066,143
PROTECTIVE APPARATUS FOR ALTERNATING CURRENT POWER SYSTEMS
Filed Feb. 27, 1934
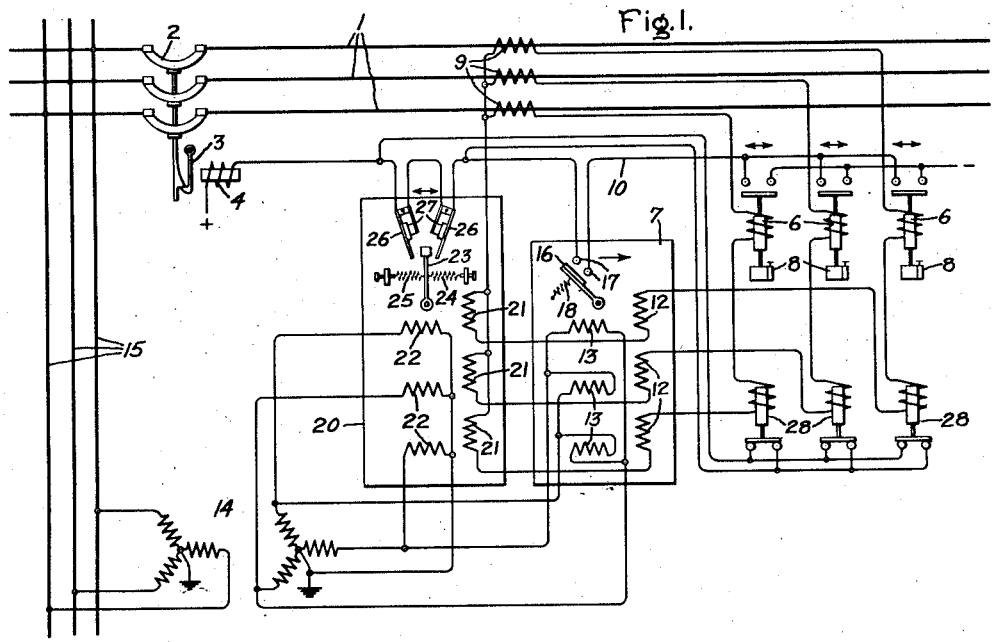
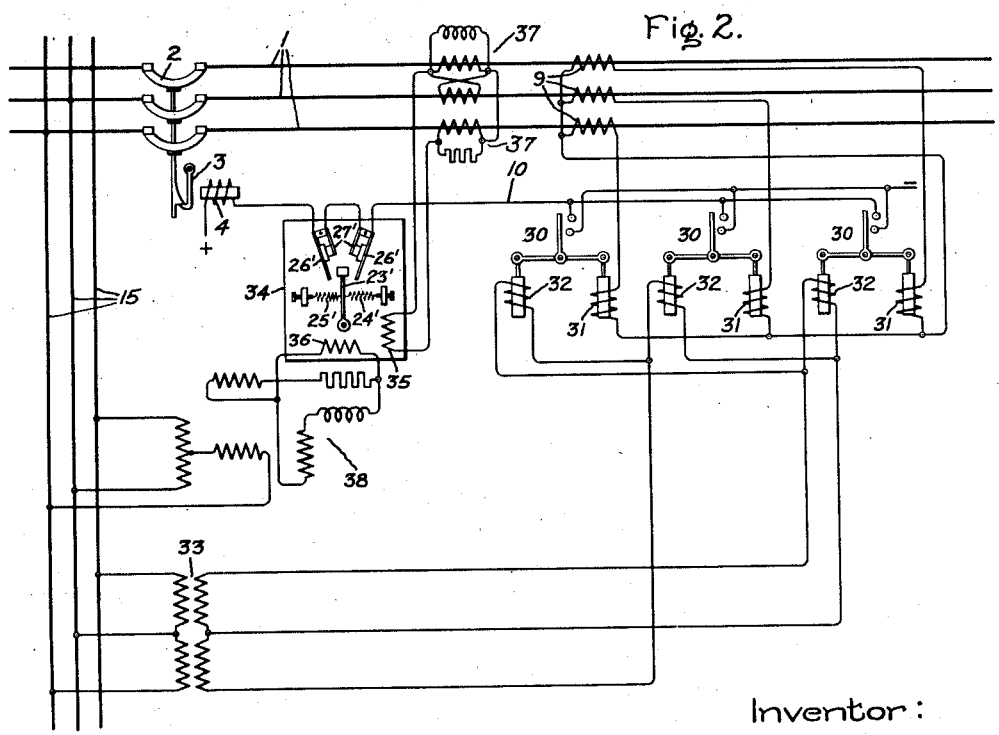
Inventor:
Selden B. Crary,
by Harry E. Dunham
His Attorney.

Patented Dec. 29, 1936

2,066,143

UNITED STATES PATENT OFFICE 2,066,143

PROTECTIVE APPARATUS FOR ALTERNATING CURRENT POWER SYSTEMS

Selden B. Crary, Schenectady, N. Y., assignor to General Electric Company, a corporation of New York Application February 27, 1934, Serial No. 713,085

13 Claims. (Cl. 175—294)

My invention relates to alternating current power transmission systems and particularly to such systems as are provided with protective apparatus for preventing injury thereto incident to the occurrence of abnormal conditions in the system.

Alternating current power transmission systems in use at the present time commonly employ protective apparatus which includes one or more circuit interrupters in each line of the system and relays for controlling the operation thereof in response to abnormal conditions in the line. Such abnormal conditions, as is well known, may comprise a fault to ground, an interphase or other fault or may comprise a power swing, sometimes called an oscillation or surge, such as may arise from a fault at some point of the system or from switching operations, etc. Both faults and power swings give rise to a condition of excessive current in the line. For reasons well known to those skilled in the art, if a fault occurs in a line the line should be cleared as soon as possible. If, however, a power swing occurs it is usually not desirable to interrupt service on the line as the power swing eventually will damp down to a condition of stable equilibrium. The protective relays provided in existing apparatus for the purpose of actuating the trip coils of the interrupters to clear the line of faults are not always able to distinguish between an excessive line current due to the existence of a fault and an excessive line current due to a power swing. As a result an interrupter sometimes is tripped open unnecessarily. It is the object of my invention therefore to provide apparatus which while still affording the desired degree of protection from the effects of faults will avoid unnecessary interruptions of the service due to power swings or oscillations.

I have found that while a fault and a power swing both produce an excessive current in the line they differ from each other very materially in the resulting relative amounts of power transferred over the line. In the case of a fault the power transferred during the fault period decreases below that initially transferred while in the case of a power swing the power materially increases above that initially transferred. I have taken advantage of this difference and have provided apparatus for the control of the line which is able to differentiate between an overcurrent condition due to a fault and that due to a power swing.

In accordance with my invention I have combined with the apparatus heretofore employed for causing an interruption of the supply of power to a line in trouble, power responsive means which when the amount of power being transferred is below a predetermined value, such as would occur during a fault, will not interfere with the functioning of such apparatus but when the amount of power being transferred is above that value will prevent the functioning of the apparatus to interrupt the power supply. While my invention is susceptible of being carried out by apparatus of various forms, I have chosen to illustrate it herein by the two embodiments described in the following description and shown by the accompanying drawing, the scope of the invention being pointed out in the appended claims.

Referring to the drawing, Fig. 1 is a circuit diagram illustrating one embodiment of my invention and Fig. 2 is a circuit diagram showing a modification.

In Fig. 1 I have shown at 1 a three phase transmission line comprising a part of a three phase power transmission system, the line being controlled by the circuit interrupter 2 which may be of any suitable and well known form. The interrupter 2 is represented as being provided with the latch 3 for holding the breaker in closed circuit position and as being provided with the tripping coil 4, energized from a suitable source not shown, by which the latch may be withdrawn in response to a predetermined overload or fault on the line thus permitting the interrupter to drop into open circuit position.

I have shown the tripping coil connected to be controlled by protective relay means illustrated as overcurrent relays 6 and a polyphase power directional relay 7. The relays 6 each include a suitable damping device 8 such for example as a dash pot whereby they close their contacts with a time delay action but open instantaneously. The relays 6 of which there is one for each phase, have their windings connected to be supplied from the line by the current transformers 9. The contacts of these relays are connected in the circuit 10 of the tripping coil 4, being arranged in parallel. Each of the relays 6 will close its contacts in the circuit 10 in response to a predetermined current in either direction on the line.

The power directional relay 7 is shown as having its current coils 12 connected in circuit with the windings of the relays 6 and as having its voltage coils 13 connected to be supplied with line voltage through the three phase potential transformer 14 which may connect, for example, with the station bus 15. It is provided with the movable contact 16 cooperating with the fixed contacts 17, the latter being connected in the tripping circuit 10, whereby the relay functions in the well known manner to close its contacts whenever there is a transfer of fault power by the line in a predetermined direction, for example, away from the station bus as indicated by the arrow shown on the relay and to hold the tripping circuit open when the power transfer is in the opposite direction. The light retracting spring 18 connected to contact 16 prevents contacts 16 and 17 from sticking together when there is no power being transferred. With the apparatus so far described the interrupter would be opened in the customary manner in response to every overcurrent condition on the line provided the transfer of power is in the direction to cause the relay 7 to close its contacts.

Inasmuch as the overcurrent relays 6, being responsive to current flow in either direction, are unable to discriminate between the overcurrent due to a fault and that due to a power swing or oscillation, it may happen that the interrupter 2 will be undesirably tripped open in response to a power swing on the line. To prevent such an occurrence, I have provided the power responsive device or relay 20 which is connected to respond to the actual power of the line 1. This relay has its current windings 21 connected in circuit with the current windings 12 of relay 7 and with the windings of relays 6, and has its voltage windings 22 connected to be supplied with line voltage through the potential transformer 14. The relay 20 is shown as having a pivoted member 23 which moves to the right or left in response to a power transfer by the line respectively from or toward the station bus 15 and which by means of the two opposed centering springs 24 and 25 is normally held in the midposition illustrated. At each side of the member 23 is the movable contact member 26 which when engaged and moved by the member 23 is separated from its cooperating fixed contact member 27. The contact members are connected in series in the circuit 10 of the tripping coil so that a predetermined amount of movement of the member 23 in either direction in response to a transfer of power in either direction on the line will open the circuit of the tripping coil. The tension of each of the springs 24 and 25 is so adjusted that it is low enough to allow the movable member to open the circuit of the tripping coil in response to power swings above the maximum kilowatt load transferred over the line but high enough so that there will be no danger of the tripping coil circuit being opened by this device in response to a high resistance fault on the line. The two springs may be tensioned equally or they may be given different tensions so that the relay shall respond to the transfer of power of one value in one direction and to the transfer of power of a different value in the other direction. Where the transfer of power in a line is always in the same direction one of the sets of contacts 26 and 27 of the power relay 20 may be omitted. The apparatus as a whole therefore is able to discriminate between overcurrent on the line due to a fault thereon and that due to a power swing or oscillation on the line. Thus the apparatus will cause the interrupter to be tripped to open circuit position in response to a fault on the line but will not cause the interrupter to be tripped open in response to a power swing on the line.

It may happen that the power transferred by the line at the time of a single phase overload or fault is so great that the movable and fixed contacts of the relay 20 are held in contact with only very light pressure. To insure the continuity of the tripping circuit under this condition, I have provided the three overcurrent relays 28 of the instantaneous operating type, one for each phase, which are shown as having their windings connected in circuit with the windings of relays 6, and which have their contacts arranged in parallel and connected in the circuit 10 to constitute a short circuit across the contacts of the relay 20. Thus if a line to ground fault or a single phase fault occurs on the line one or more of the relays 28 will remain unactuated and thereby maintain a short circuit across the contacts of the power relay 20. However, in the event of an abnormal condition affecting all phases of the line, such as an overload or a fault involving all phases or a power swing, each of the three relays 28 will operate thereby removing the short circuit across the contacts 26 and 27 and leaving the relay 20 free to operate in the intended manner.

In the modified form of my invention illustrated by Fig. 2, I have shown protective means such as distance relays 30, one for each phase, which operate to close their contacts in a time dependent on the distance to a fault but open their contacts rapidly upon disappearance of the conditions to which they respond as is well known to the art. These distance relays 30 being of well known construction need not be described in detail herein. The current windings 31 of these relays are shown connected to be supplied from the current transformers 9 on the line and the voltage windings 32 thereof are shown connected to be supplied with line voltage through the potential transformer 33. The contacts of the distance relays 30 are aranged in parallel to control the circuit 10 of the tripping coil 4.

To prevent the undesirable tripping of the interrupter 2 in response to the overcurrent due to a power swing I have provided in this case the positive phase sequence power relay 34 which is shown as having a single current winding 35 and a single voltage winding 36. The current winding is connected to be supplied from the line 1 through the positive phase sequence current network 37 and the voltage winding 36 is connected to be supplied with line voltage through the positive phase sequence voltage network 38. Except for its contacts, this relay and also the networks 37 and 38 associated therewith are disclosed in United States Letters Patent 1,535,624 issued April 28, 1925. The pivoted member 23', the springs 24' and 25', the contacts 26' and 27', and their connections in the tripping circuit 10 are shown like those of the power relay 20 of Fig. 1. Springs 24' and 25' of this relay are tensioned in a manner similar to those of the relay 20 of Fig. 1 whereby the circuit of the tripping coil 4 is opened by this relay only when the overcurrent condition on the line is that due to a power swing. Thus the apparatus disclosed by Fig. 2, like that disclosed by Fig. 1, is capable of discriminating between an overcurrent condition on the line due to a predetermined overload or fault thereon and that due to a power swing or oscillation on the line.

I have chosen the particular embodiments described above as illustrative of my invention and it will be apparent that various other modifications may be made without departing from the spirit and scope of my invention which modifications I aim to cover by the appended claims.

What I claim as new and desire to secure by Letters Patent of the United States is:

1. In combination with an alternating current power circuit having circuit interrupting means therein arranged to control the power supplied to the circuit, means responsive to a predetermined abnormal condition in said circuit for controlling said interrupting means and means responsive to the transfer of an excessive amount of power by said line for rendering said controlling means ineffective to control the interrupting means.

2. In combination with an alternating current power circuit having a circuit interrupter therein, means responsive to the abnormal condition of said circuit following a fault therein for causing said interrupter to operate and means constructed to be unresponsive to the transfer of a normal amount of power but to be responsive to the transfer of an excessive amount of power by said circuit due to a power swing therein for rendering said means ineffective to operate the interrupter.

3. In combination with an alternating current power circuit having circuit interrupting means therein arranged to control the power supplied to the circuit, apparatus including means responsive to an overcurrent condition in said circuit for controlling the operation of said interrupting means, and means actuated in response to the transfer of an excessive amount of power by said circuit for rendering said apparatus ineffective to control the operation of the interrupting means.

4. In combination an alternating current power circuit, a circuit interrupter therein having a tripping circuit, means responsive to a fault in said power circuit for controlling said tripping circuit, and means constructed to be unresponsive to the transfer of a certain amount of power to said fault but to be responsive to the transfer of a predetermined greater amount of power by said power circuit for controlling said tripping circuit.

5. In combination an alternating current power circuit, a circuit interrupter therein arranged to control the power supplied to the circuit and having a tripping coil, means responsive to a predetermined abnormal condition in said circuit for closing the circuit of said coil to trip open the interrupter and means responsive to the transfer of a predetermined excessive amount of power by said power circuit for opening the circuit of said coil to prevent the tripping of the interrupter.

6. In an alternating current power transmission system, the combination of a transmission line, a circuit interrupter therein having a tripping coil, overcurrent and power directional relays associated with said line and connected to control the circuit of said coil and a power relay associated with said line and operative to cause said relays to lose control of the circuit of said coil.

7. In an alternating current power transmission system, the combination of a transmission line, a circuit interrupter therein having a tripping coil, overcurrent and power directional relays associated with said line and connected to close the circuit of said coil to trip the interrupter and a power relay associated with said line and connected to open said circuit when the power transferred by the line reaches a predetermined high value.

8. In an alternating current power transmission system, the combination of a polyphase transmission line, a circuit interrupter therein, means responsive to a predetermined abnormal condition in said line for controlling the operation of said interrupter and means responsive to the transfer of a predetermined amount of power by said line for rendering said means ineffective to control the interrupter and means for limiting the effectiveness of said last mentioned means to the existence of an abnormal condition affecting all phases of the line.

9. In an alternating current power transmission system, the combination of a three phase transmission line, a circuit interrupter therein having a tripping coil, means responsive to a predetermined overcurrent condition in said line for closing the circuit of said coil, means responsive to the transfer of a predetermined amount of power by said line for opening said circuit, a shunt across said last mentioned means and means responsive to a simultaneous overcurrent condition on all three phases of said line for opening said shunt.

10. In an alternating current power transmission system, the combination of a polyphase transmission line, a circuit interrupter therein having a tripping coil, means comprising an overcurrent relay connected with each phase of the line and a power directional relay for closing the circuit of said coil, a power relay connected with the phases of said line and having contacts for opening said circuit in response to the transfer of a predetermined amount of power by said line and a plurality of overcurrent relays each connected to be energized from one of said phases and each arranged when unactuated to shunt said contacts.

11. In combination with a polyphase current circuit and circuit interrupting means therefor, means for controlling said interrupting means including fault responsive means connected to be energized from said circuit and means responsive only to the positive phase sequence component of a predetermined high value of the power in said circuit for rendering said fault responsive means ineffective for the duration of said high power value.

12. In an alternating current power transmission system, the combination of a transmission line, a circuit interrupter therein having a trippin coil, distance relays associated with said line and connected to control the circuit of said coil and a positive phase sequence power relay associated with said line and connected to open said circuit in response to a predetermined high value of power transmitted by said line.

13. In an alternating current power transmission system, the combination of a transmission line, a circuit interrupter therein having a tripping coil, distance relays associated with said line and connected to close the circuit of said coil to trip the interrupter and a positive phase sequence power relay associated with said line and connected to open said circuit when the power transferred by the line reaches a predetermined high value.

SELDEN B. CRARY.